(12) United States Patent
Babu et al.

(10) Patent No.: US 11,810,068 B2
(45) Date of Patent: Nov. 7, 2023

(54) SYSTEM AND METHOD TO IDENTIFY LOW PERFORMING PARAMETERS OF THE SAME CONTENT HOSTED ON DIFFERENT PLATFORMS

(71) Applicant: Dell Products L.P., Round Rock, TX (US)

(72) Inventors: Rathi Babu, Bangalore (IN); Mainak Roy, Bangalore (IN)

(73) Assignee: Dell Products L.P., Round Rock, TX (US)

( * ) Notice: Subject to any disclaimer, the term of this patent is extended or adjusted under 35 U.S.C. 154(b) by 470 days.

(21) Appl. No.: 16/896,670

(22) Filed: Jun. 9, 2020

(65) Prior Publication Data

US 2021/0383327 A1     Dec. 9, 2021

(51) Int. Cl.
| | |
|---|---|
| *G06F 16/13* | (2019.01) |
| *G06F 40/221* | (2020.01) |
| *G06Q 10/10* | (2023.01) |
| *H04L 67/10* | (2022.01) |
| *G06F 8/41* | (2018.01) |
| *G06F 16/16* | (2019.01) |

(52) U.S. Cl.
CPC ............. *G06Q 10/10* (2013.01); *G06F 8/427* (2013.01); *G06F 16/13* (2019.01); *G06F 16/164* (2019.01); *G06F 40/221* (2020.01); *H04L 67/10* (2013.01)

(58) Field of Classification Search
CPC ....... G06Q 10/10; G06F 16/164; G06F 16/13; G06F 40/221; H04L 67/10

USPC ........................................................ 709/223
See application file for complete search history.

(56) References Cited

U.S. PATENT DOCUMENTS

| | | | |
|---|---|---|---|
| 9,552,249 B1 * | 1/2017 | James ................. | G06F 11/0793 |
| 10,324,822 B1 * | 6/2019 | Chopra .............. | G06F 11/3616 |
| 11,288,163 B1 * | 3/2022 | Kowalewski ....... | G06F 11/3428 |
| 2004/0264592 A1 * | 12/2004 | Sibecas .................. | H01Q 21/24 |
| | | | 375/267 |
| 2005/0049901 A1 * | 3/2005 | Diao ................... | G06F 11/3447 |
| | | | 703/2 |
| 2006/0106851 A1 * | 5/2006 | Warshawsky ....... | G06F 16/2358 |
| 2012/0209571 A1 * | 8/2012 | Peterson ............. | G06F 11/3616 |
| | | | 702/186 |
| 2015/0244581 A1 * | 8/2015 | Angaluri ............. | H04L 41/0823 |
| | | | 709/224 |
| 2018/0189073 A1 * | 7/2018 | Larabie-Belanger ... | G06F 9/451 |
| 2021/0182165 A1 * | 6/2021 | Kammath ........... | G06F 11/3466 |

* cited by examiner

*Primary Examiner* — Brian Whipple
(74) *Attorney, Agent, or Firm* — Terrile, Cannatti & Chambers; Emmanuel A. Rivera

(57) ABSTRACT

A system, method, and computer-readable medium are disclosed to identify low performing parameters of the same content hosted on different platforms. The same content is provided to different platforms, where the same content includes an agent specific to a platform. Communication is performed to an agent on a platform to capture parameter data related to the same content. The captured parameter data is parsed to identify low performing parameter data on the platform. Quality checks are performed on the identified low performing parameter data on the platform. A report is provided on the same content and the low performing parameter data. A system, method, and computer-readable medium are disclosed for.

20 Claims, 5 Drawing Sheets

SYSTEM AND METHOD TO IDENTIFY LOW PERFORMING PARAMETERS OF THE SAME CONTENT HOSTED ON DIFFERENT PLATFORMS

BACKGROUND OF THE INVENTION

Field of the Invention

The present invention relates to the management of information handling systems. More specifically, embodiments of the invention provide a system, method, and computer-readable medium for identifying low performing parameters of the same content hosted on different platforms.

Description of the Related Art

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

An entity, such as a business, oftentimes provides content, such as multimedia to be used and distribute over different platforms. The content originates from the business as a source file having a particular format known and controlled by the originating business. The content and the information contained in the content can be consumed by different portals via different media outlets. In certain instances, content format is changed to a different file type. Changes to the content, including file type changes, may be implemented to support particular platforms. As platforms that host the content vary, file types can vary. The content may perform well in a certain format on a platform.

As the content is hosted on different platforms, consumer interaction with and consumption of the content, or consumer use patterns, can vary between different platforms. This can be the case since targeted audiences can vary. The content may have greater consumer visibility on one platform and less visibility on another platform.

The originating business has interest in how the content is being used by consumers and as to which platforms the content is performing well or high consumer use, and the platforms where content is not performing very well or low consumer use. There is a difficulty in synthesizing or processing consumption patterns of the content and understanding and analyzing the data of the content when the content is hosted on different platforms.

It is desirable to acquire and analyze data or information that would help determine content usage from the different platforms. Analytical tools that support such, can be different and vary. The analytical tools can be specific to certain platforms and certain data formats. It is desirable to have a common analytical tool that can capture data from different platforms for the same content and compile an analytics report for the business.

SUMMARY OF THE INVENTION

A system, method, and computer-readable medium are disclosed to identify low performing parameters of the same content hosted on different platforms. The same content is provided to different platforms, where the same content includes an agent specific to a platform. Communication is performed to an agent on a platform to capture parameter data related to the same content. The captured parameter data is parsed to identify low performing parameter data on the platform. Quality checks are performed on the identified low performing parameter data on the platform. A report is provided on the same content and the low performing parameter data.

BRIEF DESCRIPTION OF THE DRAWINGS

The present invention may be better understood, and its numerous objects, features and advantages made apparent to those skilled in the art by referencing the accompanying drawings. The use of the same reference number throughout the several figures designates a like or similar element.

DETAILED DESCRIPTION

A system, method, and computer-readable medium are disclosed for identifying low performing parameters of the same source file hosted on different platforms. Cross platform data of parameters related to the same content are managed through platform specific agents or plugin files. A polarized vector filter is used to derive business specific parameter data when business rules are different. In certain implementations, the polarized vector is implemented by an analytics module that can be part of a business infrastructure. A learning algorithm identifies relevant parameter data from different file formats hosted on different platforms. While collecting the parameter data from the different platforms, focus is on business driven categories. A reinforcement module allows a business or business units to perform decisions based on the received and processed parameter data.

For purposes of this disclosure, an information handling system may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, or other purposes. For example, an information handling system may be a personal computer, a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a keyboard, a mouse, and a video display. The information handling system may also include one or more buses operable to transmit communications between the various hardware components.

Figure 1:
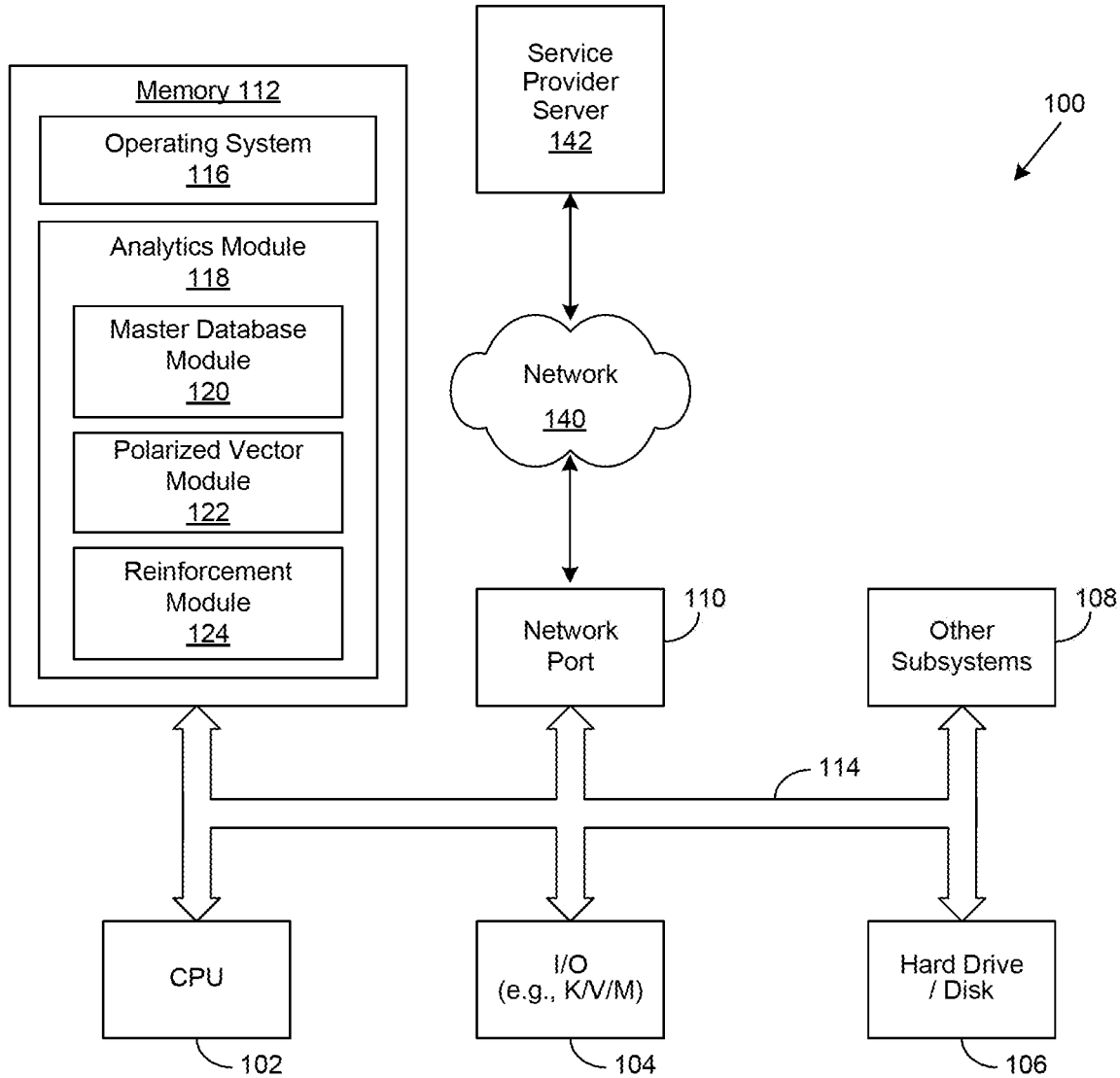
FIG. 1 is a general illustration of components of an information handling system as implemented in the system and method of the present invention.

FIG. 1 is a generalized illustration of an information handling system that can be used to implement the system and method of the present invention. The information handling system 100 includes a processor (e.g., central processor unit or "CPU") 102, input/output (I/O) devices 104, such as a display, a keyboard, a mouse, and associated controllers, a hard drive or disk storage 106, and various other subsystems 108. In various embodiments, the information handling system 100 also includes network port 110 operable to connect to a network 140, which is likewise accessible by a service provider server 142. The network 140 may be a public network, such as the Internet, a physical private network, a wireless network, a virtual private network (VPN), or any combination thereof. Skilled practitioners of the art will recognize that many such embodiments are possible, and the foregoing is not intended to limit the spirit, scope or intent of the invention.

The information handling system 100 likewise includes system memory 112, which is interconnected to the foregoing via one or more buses 114. System memory 112 further includes operating system (OS) 116. In various embodiments system memory 112 include an analytics module 118 which includes a master database module 120, a polarized vector module 122, and a reinforcement vector module 122, which are further described herein. In certain implementations, the master database module 118 is included as part of hard drive or disk storage 106.

In certain embodiments, the information handling system 100 is able to download the analytics module 118 from the service provider server 142. In another embodiment, the analytics module 118 is provided as a service from the service provider server 142.

Figure 2:
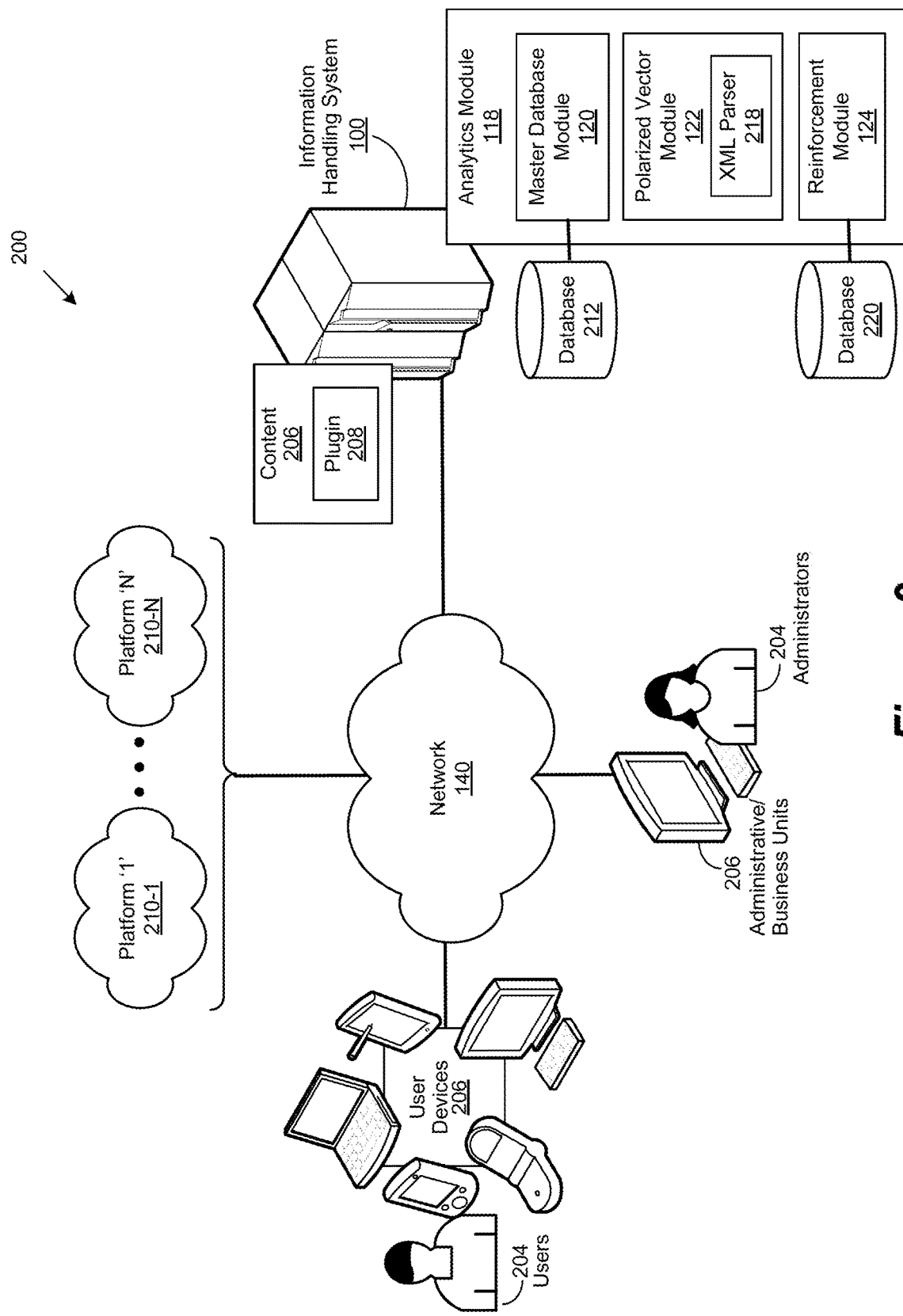
FIG. 2 is a simplified block diagram of a system that implements an information handling system to identify low performing parameters of the same source file hosted on different platforms.

FIG. 2 is a simplified block diagram of a system identifying low performing parameters of the same source file hosted on different platforms. The system 200 includes the information handling system 100. In certain implementations, the information handling system 100 is an infrastructure for a business. As described in FIG. 1, the information handling system 100 includes the analytics module 118. In certain implementations, where the information handling system 100 is an infrastructure that supports a business, and the analytics module 118 builds upon such a business infrastructure. The business infrastructure, and the information handling system 100 in particular, supports various administrative or business units as represented by administrative/business units 202. Administrators 204 access the information handling system 100 through administrative/business units 202.

The business infrastructure or information handling system 100 provides content 206, such as documents, multimedia content including video, etc. in the form of a known source file to the information handling system 100. The source file of content includes an agent or plugin file 208.

The content 206 is sent to different platforms as represented by platform '1' 210-1 to platform 'N' 210-N. Examples of platforms 210 include social media sites, multimedia sites, searching sites, etc. File type of received content 206 can be changed to accommodate use on the respective platform 210. In various implementations, different agents or plugin files 208 are provided for different platforms. Agent or plugin file 208 is configured to run on a specific platform 210. The agent or plugin file 208 isolates a platform 210 and raises specific queries for the platform 210 to identify individual datasets that contain information about a particular parameter/file on the specific platform 210. For example, a query can vary for multiple web services, as web services use multiple platforms.

In certain implementations, the master database module 120 includes or has access to all the content 206 that is sent/delivered from the information handling system 100. In certain implementations, such content 206 is stored in database 212 that is part of the business infrastructure. Content 206, and files associated with content 206 include file names, globally unique identifiers (GUID), and other identifiers.

It is desirable to determine how content 206 is consumed by users 214. Consumers or users 214 access and use content 206 through user devices 216 which access platform '1' 210-1 to platform 'N' 210-N. A user device 216 refers to an information handling system such as a personal computer, a laptop computer, a tablet computer, a personal digital assistant (PDA), a smart phone, a mobile telephone, or other device that is capable of communicating and processing data.

In certain implementations, the master database module 120 with agent(s) plugin file(s) 208 initializes a process to start communication with multiple web services and capture data or metadata related to the content 206. The initiated communication can be based on a business task as defined by administrative/business units 206. The data or metadata can be defined as file level parameters. Such fetched data or metadata can be in the form of an XML format. The file level parameters are collected from different platforms 210 for the same set of data. In certain implementations, such data is received with additional appended metadata from a particular platform 210.

In certain implementations, the polarized vector module 122 includes an XML parser 218. The XML parser 218 can implement a polarized vector algorithm that applies different decision parameters on parameter level data. "Noise" from the data is eliminated in order to assure that business critical parameters or data is not damaged.

Business critical parameters or data are tracked for the same content 206 at platform '1' 210-1 to platform 'N' 210-N which are different from one another, by the following. Based on an input string provided to an agent or plugin file 208 residing on a platform 210, an algorithm on the polarized vector module searches for an exact match in master database module 120/database 212. Because, master database module 120/database 212 includes data from sources (i.e., web services and multiple platforms 210), results produced covers data across multiple web services and multiple platforms 210 in which a parameter has been posted.

Furthermore, in certain implementations, the XML parser 218 can be provided with configurable parameters, such as from administrators 204, to pull data for corresponding meta data. Such queries can be matched against the input string provided to an agent or plugin file 208 to collect combined data. Certain implementations provide for collecting exact or 100% matched content. Since content provided by the business is followed, the correct file name, GUID, and identifiers of the files are used. This avoids dependencies on keywords which can lead to information or data that is inaccurately fetched.

The polarized vector module 122 implements a polarized vector filter to ensure that only business driven parameters are capture from accumulated data sets. The polarized vector algorithm allows the ability to define the characterization of each file level parameter. The polarized vector algorithm checks each file level parameter that are associated with a file type and plots each file level parameter against pre-defined values which may be set by administrative/business units 206. Vector plotting of each parameter shows the relevancy of a parameter. The applied filter removes noise which are non-critical parameters and projects status of business critical parameter. The resulting vector parameters determine the performance of each parameter associated to a file type. Each platform 210 can append their predefined dataset to any file parameter; however, business drive data is focused on and chosen to avoid noise or non-business parameters. Therefore, the algorithm implements the polarized vector filter to determine what to remove from a specific platform 210.

In certain implementations, the polarized vector filter is configured for each administrative/business unit 206. Filtering criteria can be different for each administrative/business unit 206 since business requirements can be different. Relevant data for one administrative/business unit 206 may be noise for another administrative/business unit 206. Therefore, different polarized vector filter can be implemented specific for administrative/business units 206. The performance of a polarized vector filter can be improved as more data is processed.

In certain implementations, the reinforcement module 124 performs decision making. The reinforcement module 124 can be configured as a training module. Based on the outcome determined by the polarized vector algorithm, the reinforcement module 124 performs certain quality checks on parameters related to performance. The quality checks can be presented as an audited report(s) to administrative/business units 206. Examples of performance can include the following. Readability is related to how easily a user 204 can consume information from the content 206 from a platform 210. Indexability is related to how easily "search crawlers" can index content 206 from different source formats from platforms 210. Searchability is related to how easily content 206 appears during a search by users 204. Meta-tagging options relate to having sufficient metadata and metatags in source code or landing page of content 206 form different platforms 210. Content correlation is related to how relevant the content 206 from a platform 210 is against a topic title or image caption. Accessibility is related to how easily users 204 can access the content 206 from a platform 210 and navigate through the content 206 without having any blocker.

The audited report(s) can allow administrators 204 of administrative/business units 206 to determine how to address low performing content 206 based on the parameters that are determined by reinforcement module 124. In certain implementations, the reinforcement module 124 maintains a separate database 220 that includes data (e.g., files) of low performing parameters that are being rectified by administrative/business units 206. This can allow actions taken as to the data (e.g., files) are categorized and saved to the database 220, such that common actions can be found which have been executed to elevate the performance of low performing parameters. The data (e.g., files) can be used in the future to provide recommendation to the administrators 204 of administrative/business units 206 to improve a certain low performing parameters.

Figure 3:
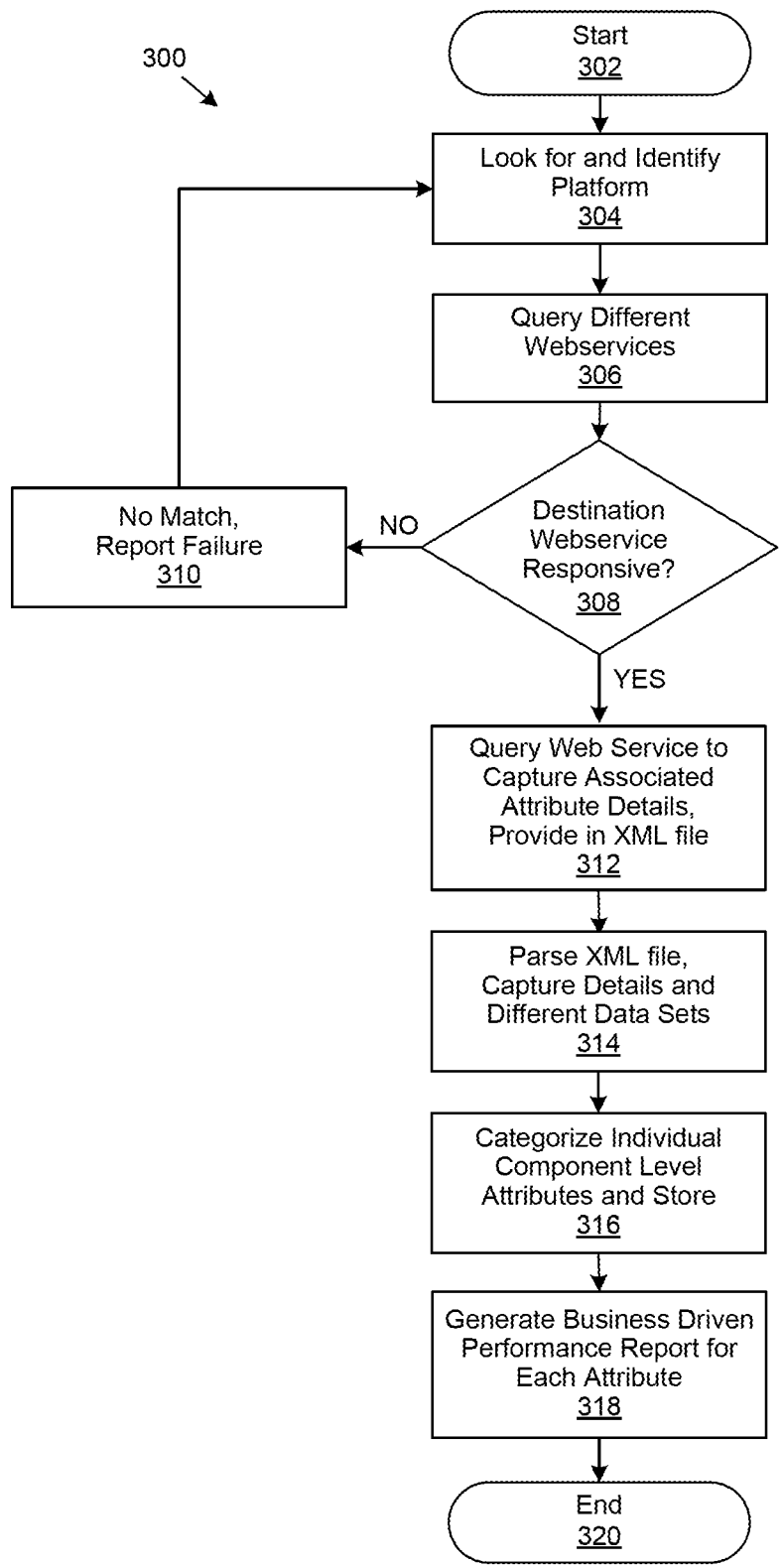
FIG. 3 is a generalized flowchart for tracking business critical parameters for the same content from different platforms.

FIG. 3 is a generalized flowchart for tracking business critical parameters for the same content from different platforms. The order in which the method is described is not intended to be construed as a limitation, and any number of the described method blocks may be combined in an y order to implement the method, or alternate method. Additionally, individual blocks may be deleted from the method without departing from the spirit and scope of the subject matter described herein. Furthermore, the method may be implemented in any suitable hardware, software, firmware, or a combination thereof, without departing from the scope of the invention.

At step 302, the process 300 begins. At step 304, a platform 210 that hosts content 206 is looked for and identified. The content 206 includes a predefined agent or plugin file 208 that is specific to the platform 210. Each content 206 provided by information handling system 100, which can be an infrastructure that supports a business, includes the predefined agent or plugin file 208, where the content 206 is the same "object" provided to the "N" number of platforms 210, and can include "file name," GUID, other identifiers, object ID mapping, etc.

At step 308, a determination is made if a destination webservice is response to the content 206 hosted on the particular platform 210. If the determination is "NO," at step 310, no match and failure are reported. The agent or plugin file 206 can be configured to perform the reporting.

If the determination at step 308 is "YES," at step 312, webservices are queried to capture parameter details which can be file level parameters in the form of data or metadata. An XML file can be generated.

At step 314, the information handling system 100 receives the XML file and parses the XM file. In particular, the XML parser 218 performs the parsing. Details are captured and different datasets are accumulated for content 206.

At step 316, individual file level parameters are categorized and stored. The master data module 120 can store the file level parameters. At step, 318, performance reports for attribute of content 206 is generated. The performance reports can be specific for requirements of particular administrative/business units 206. An audited content 206 is generated. At step 320, the process 300 ends.

Figure 4:
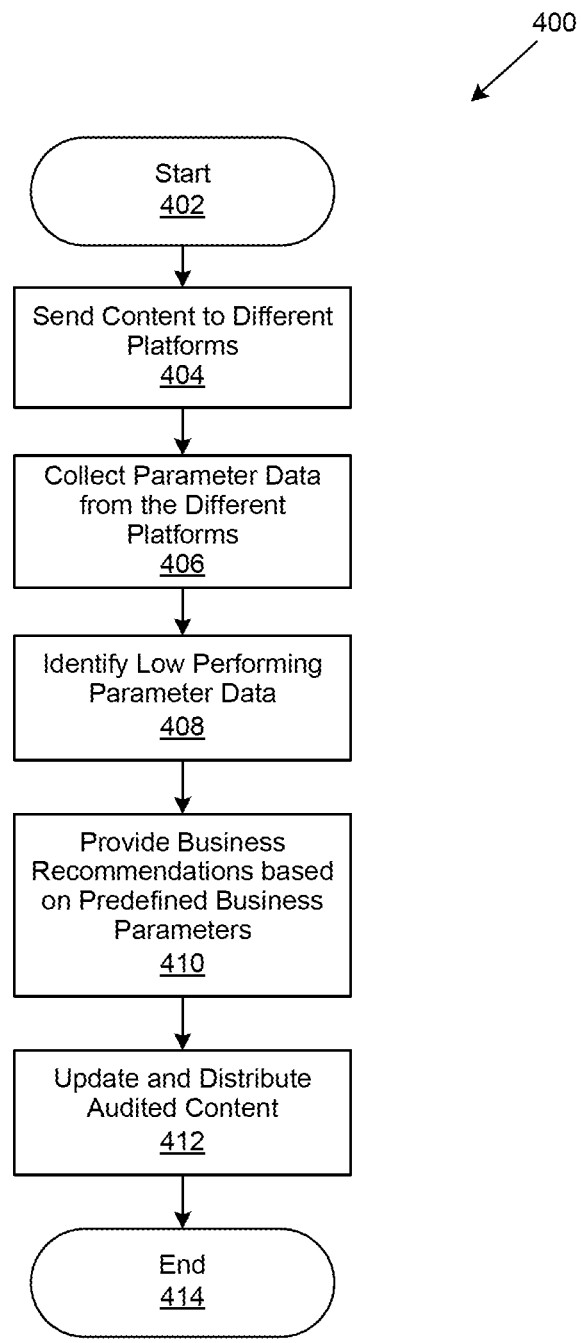
FIG. 4 is a generalized flowchart of an overview to identify low performing parameters of the same content hosted on different platforms.

FIG. 4 is a generalized flowchart of an overview to identify low performing parameters of the same content hosted on different platforms. The order in which the method is described is not intended to be construed as a limitation, and any number of the described method blocks may be combined in an y order to implement the method, or alternate method. Additionally, individual blocks may be deleted from the method without departing from the spirit and scope of the subject matter described herein. Furthermore, the method may be implemented in any suitable hardware, software, firmware, or a combination thereof, without departing from the scope of the invention.

At step 402, the process 400 begins. At step 404, content 206 is sent by the information handling system 100 to different platforms 210. As described, the content 206 is the same "object" provided to the "N" number of platforms 210, and can include "file name", GUID, other identifiers, object ID mapping, etc. The content 206 includes platform specific agent or plugin file 208. At step 406, through the or agent plugin file 408, parameter data is collected by the analytics module 118 from the platforms 210. In particular, the parameter data can be related to usage of the content 206 on respective platforms 210. At step 408, low performing parameter data is identified. The reinforcement module 124 can perform the identifying. At step 410, based on the identified parameter data, which are predefined by particular administrative/business units 206, business recommendations can be made. At step 412, audited content 206 is updated and provided/stored in certain implementation at master database 120 and/or data base 212. At step 414, the process 400 ends.

Figure 5:
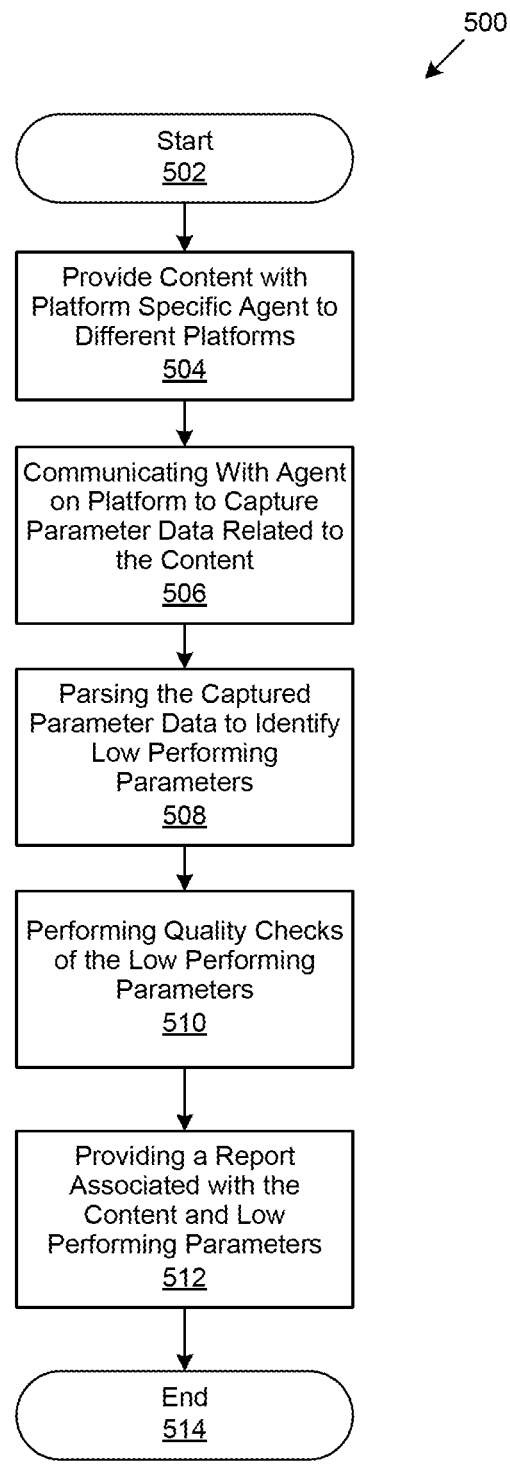
FIG. 5 is a generalized flowchart for identifying low performing parameters of the same content hosted on different platforms.

FIG. 5 is a generalized flowchart of identifying low performing parameters of the same content hosted on different platforms. The order in which the method is described is not intended to be construed as a limitation, and any number of the described method blocks may be combined in any order to implement the method, or alternate method. Additionally, individual blocks may be deleted from the method without departing from the spirit and scope of the subject matter described herein. Furthermore, the method may be implemented in any suitable hardware, software, firmware, or a combination thereof, without departing from the scope of the invention.

At step 502, the process 500 begins. At step 504, the same content 206 with a platform specific agent or plugin file 208 is provided to different platforms 210 by master database module 120. At step 502, communication is performed with analytics module 118 to agent or plugin file 208 at a platform 210 to capture parameter data related to the content 206. At step 508, the polarized vector module 122 performs parsing of the captured parameter data is performed to identify low performing parameter data. At step 510, quality checks on low performing parameter data are performed by reinforcement module 124. At step 512, reinforcement module 124 provides a report of the content and low performing parameter data associated with the content. At block 512, the process 500 ends.

As will be appreciated by one skilled in the art, the present invention may be embodied as a method, system, or computer program product. Accordingly, embodiments of the invention may be implemented entirely in hardware, entirely in software (including firmware, resident software, microcode, etc.) or in an embodiment combining software and hardware. These various embodiments may all generally be referred to herein as a "circuit," "module," or "system." Furthermore, the present invention may take the form of a computer program product on a computer-usable storage medium having computer-usable program code embodied in the medium.

Any suitable computer usable or computer readable medium may be utilized. The computer-usable or computer-readable medium may be, for example, but not limited to, an electronic, magnetic, optical, electromagnetic, infrared, or semiconductor system, apparatus, or device. More specific examples (a non-exhaustive list) of the computer-readable medium would include the following: a portable computer diskette, a hard disk, a random access memory (RAM), a read-only memory (ROM), an erasable programmable read-only memory (EPROM or Flash memory), a portable compact disc read-only memory (CD-ROM), an optical storage device, or a magnetic storage device. In the context of this document, a computer-usable or computer-readable medium may be any medium that can contain, store, communicate, or transport the program for use by or in connection with the instruction execution system, apparatus, or device.

Computer program code for carrying out operations of the present invention may be written in an object oriented programming language such as Java, Smalltalk, C++ or the like. However, the computer program code for carrying out operations of the present invention may also be written in conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through a local area network (LAN) or a wide area network (WAN), or the connection may be made to an external computer (for example, through the Internet using an Internet Service Provider).

Embodiments of the invention are described with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable memory that can direct a computer or other programmable data processing apparatus to function in a particular manner, such that the instructions stored in the computer-readable memory produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks.

The present invention is well adapted to attain the advantages mentioned as well as others inherent therein. While the present invention has been depicted, described, and is defined by reference to particular embodiments of the invention, such references do not imply a limitation on the invention, and no such limitation is to be inferred. The invention is capable of considerable modification, alteration, and equivalents in form and function, as will occur to those ordinarily skilled in the pertinent arts. The depicted and described embodiments are examples only and are not exhaustive of the scope of the invention.

Consequently, the invention is intended to be limited only by the spirit and scope of the appended claims, giving full cognizance to equivalents in all respects.

What is claimed is:

1. A computer-implementable method performed by an information handling system to identify low performing parameters with same content hosted on different platforms comprising:
   providing by the information handling system through a network, the same content to the different platforms, wherein the same content comprises an agent specific to a platform;
   communicating by the information handling system, to an agent on a platform to capture parameter data related to the same content, wherein the parameter data is in an XML file;
   parsing by a polarizing vector the XML file of the captured parameter data to identify low performing parameter data on the platform using configurable parameters to pull data from corresponding meta data;
   performing by the information handling system, quality checks on the identified low performing parameter data on the platform; and
   providing by the information handling system, an automated report on the same content and the low performing parameter data.

2. The method of claim 1, wherein the same content comprises file name, globally unique identifiers (GUID), and object ID mapping.

3. The method of claim 1, wherein the parameter data to be captured is defined by a business unit.

4. The method of claim 1, wherein the parsing is performed by an algorithm that processes business driven parameters captured from accumulated data sets, defines characterization of each file level parameter, checks each file level parameter associated with a file type and plots each file level parameter against predefined values.

5. The method of claim 1, wherein the parsing eliminates non-business unit related parameter data.

6. The method of claim 1, wherein the quality checks are related to performance that addresses one or more of readability, indexability, searchability, meta-tagging, content creation, and accessibility of the same content.

7. The method of claim 1 further comprising storing files with the low performing data for use by a business unit.

8. A system comprising:
   a processor;
   a data bus coupled to the processor; and
   a non-transitory, computer-readable storage medium embodying computer program code, the non-transitory, computer-readable storage medium being coupled to the data bus, the computer program code interacting with a plurality of computer operations to identify low performing parameters with same content hosted on different platforms comprising and comprising instructions executable by the processor and configured for:
      providing by the information handling system through a network, the same content to the different platforms, wherein the same content comprises an agent specific to a platform;
      communicating by the information handling system, to an agent on a platform to capture parameter data related to the same content, wherein the parameter data is in an XML file;
      parsing by a polarizing vector the XML file of the captured parameter data to identify low performing parameter data on the platform using configurable parameters to pull data from corresponding meta data;
      performing by the information handling system, quality checks on the identified low performing parameter data on the platform; and
      providing by the information handling system, an automated report on the same content and the low performing parameter data.

9. The system of claim 8, wherein the same content comprises file name, globally unique identifiers (GUID), and object ID mapping.

10. The system of claim 8, wherein the parameter data to be captured is defined by a business unit.

11. The system of claim 8, wherein the parsing is performed by an algorithm that processes business driven parameters captured from accumulated data sets, defines characterization of each file level parameter, checks each file level parameter associated with a file type and plots each file level parameter against predefined values.

12. The system of claim 8, wherein the parsing eliminates non-business unit related parameter data.

13. The system of claim 8, wherein the quality checks are related to performance that addresses one or more of readability, indexability, searchability, meta-tagging, content creation, and accessibility of the same content.

14. The system of claim 8 further comprising storing files with the low performing data for use by a business unit.

15. A non-transitory, computer-readable storage medium embodying computer program code to identify low performing parameters with same content hosted on different platforms, the computer program code executable on an information handling system and comprising computer executable instructions configured for:
   providing by the information handling system through a network, the same content to the different platforms, wherein the same content comprises an agent specific to a platform;
   communicating by the information handling system, to an agent on a platform to capture parameter data related to the same content, wherein the parameter data is in an XML file;
   parsing by a polarizing vector the XML file of the captured parameter data to identify low performing parameter data on the platform using configurable parameters to pull data from corresponding meta data;
   performing by the information handling system, quality checks on the identified low performing parameter data on the platform; and
   providing by the information handling system, an automated report on the same content and the low performing parameter data.

16. The non-transitory, computer-readable storage medium of claim 15, wherein the same content comprises file name, globally unique identifiers (GUID), and object ID mapping.

17. The non-transitory, computer-readable storage medium of claim 15, wherein the parameter data to be captured is defined by a business unit.

18. The non-transitory, computer-readable storage medium of claim 15, wherein parsing is performed by an algorithm that processes business driven parameters captured from accumulated data sets, defines characterization of each file level parameter, checks each file level parameter associated with a file type and plots each file level parameter against predefined values.

19. The non-transitory, computer-readable storage medium of claim 15, wherein the parsing eliminates non-business unit related parameter data.

20. The non-transitory, computer-readable storage medium of claim 15, wherein the quality checks are related to performance that addresses one or more of readability, indexability, searchability, meta-tagging, content creation, and accessibility of the same content.

\* \* \* \* \*